(12) United States Patent
Mahdi

(10) Patent No.: US 10,462,191 B2
(45) Date of Patent: Oct. 29, 2019

(54) CIRCUIT-SWITCHED AND MULTIMEDIA SUBSYSTEM VOICE CONTINUITY WITH BEARER PATH INTERRUPTION

(75) Inventor: Kaniz Mahdi, Carrollton, TX (US)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

(21) Appl. No.: 13/620,742

(22) Filed: Sep. 15, 2012

(65) Prior Publication Data

US 2013/0022039 A1   Jan. 24, 2013

Related U.S. Application Data

(63) Continuation of application No. 11/440,165, filed on May 24, 2006, now abandoned.
(Continued)

(51) Int. Cl.
*H04L 12/66* (2006.01)
*H04M 7/00* (2006.01)
(Continued)

(52) U.S. Cl.
CPC ................. *H04L 65/1016* (2013.01)

(58) Field of Classification Search
CPC .... H04W 36/14; H04W 36/022; H04W 48/14
See application file for complete search history.

(56) References Cited

U.S. PATENT DOCUMENTS 5,497,411 A   3/1996 Pellerin
6,067,453 A   5/2000 Adiwoso et al.
(Continued)

FOREIGN PATENT DOCUMENTS

CA   2501991 A1   4/2004
WO   0060785 A1   10/2000
(Continued)

OTHER PUBLICATIONS

Canadian Examiner's Report dated Aug. 22, 2013 in Canadian Application No. 2,609,942.
(Continued)

*Primary Examiner* — Khaled M Kassim
*Assistant Examiner* — Jason A Harley
(74) *Attorney, Agent, or Firm* — Conley Rose, P.C.; J. Robert Brown, Jr.; Albert A. Abbou

(57) ABSTRACT

The present invention maintains calls during transfers between different types of subsystems, even when there is a bearer path interruption at the user element due to the original connection from the transferring-out subsystem being dropped before the new connection in the transferring-in subsystem is established. The call signaling leg toward the remote endpoint of the remote party is held, while the call signaling leg toward the user element is moved from the transferring-out subsystem to the transferring-in subsystem and a new bearer path is established via the transferring-in subsystem. During transfers with a bearer path interruption, a portion of the bearer path leading to the remote endpoint may be connected to a media resource function, which will provide an announcement to the remote party. Once the user element is accessible in the transferring-in subsystem, the bearer path is further transferred to the user element via the transferring-in subsystem.

15 Claims, 11 Drawing Sheets

Related U.S. Application Data

(60) Provisional application No. 60/685,645, filed on May 27, 2005.

(51) Int. Cl.
*H04W 36/00* (2009.01)
*H04W 4/16* (2009.01)
*H04L 29/06* (2006.01)

(56) References Cited

U.S. PATENT DOCUMENTS

| | | | |
|---|---|---|---|
| 6,353,596 B1 | 3/2002 | Grossglauser et al. | |
| 6,721,565 B1 | 4/2004 | Ejzak et al. | |
| 6,961,774 B1 | 11/2005 | Shannon et al. | |
| 8,873,540 B2 | 10/2014 | Mandi et al. | |
| 2002/0075905 A1* | 6/2002 | Goldstein | 370/522 |
| 2002/0133600 A1 | 9/2002 | Williams et al. | |
| 2003/0027569 A1 | 2/2003 | Ejzak | |
| 2003/0169725 A1* | 9/2003 | Ahmavaara et al. | 370/352 |
| 2003/0174688 A1 | 9/2003 | Ahmed et al. | |
| 2004/0157600 A1 | 8/2004 | Stumpert et al. | |
| 2004/0196816 A1* | 10/2004 | Koskinen | H04M 15/00 370/338 |
| 2004/0215787 A1* | 10/2004 | Gibson et al. | 709/227 |
| 2004/0246965 A1* | 12/2004 | Westman | H04L 29/1216 370/392 |
| 2004/0246990 A1 | 12/2004 | Krishnamurthi et al. | |
| 2004/0258050 A1* | 12/2004 | Sylvain et al. | 370/352 |
| 2004/0259549 A1* | 12/2004 | Ejzak | H04W 36/0022 455/439 |
| 2005/0002381 A1* | 1/2005 | Westman et al. | 370/352 |
| 2005/0002407 A1* | 1/2005 | Shaheen et al. | 370/401 |
| 2005/0025047 A1* | 2/2005 | Bodin et al. | 370/229 |
| 2005/0026558 A1* | 2/2005 | Stura | H04M 15/65 455/3.06 |
| 2005/0047435 A1* | 3/2005 | Segal | H04W 36/0011 370/466 |
| 2005/0232225 A1* | 10/2005 | Pelaez et al. | 370/351 |
| 2005/0286531 A1 | 12/2005 | Tuohino et al. | |
| 2006/0002355 A1 | 1/2006 | Baek et al. | |
| 2006/0034270 A1 | 2/2006 | Haase et al. | |
| 2006/0046714 A1* | 3/2006 | Kalavade | 455/428 |
| 2006/0083199 A1 | 4/2006 | Yang | |
| 2006/0114913 A1* | 6/2006 | Cai | H04L 12/14 370/395.52 |
| 2006/0120362 A1* | 6/2006 | Westman | H04L 29/12113 370/389 |
| 2006/0233333 A1* | 10/2006 | Brombal | H04L 65/1006 379/114.2 |
| 2006/0268781 A1* | 11/2006 | Svensson | H04W 36/0022 370/331 |
| 2007/0041367 A1 | 2/2007 | Mahdi | |
| 2007/0100981 A1* | 5/2007 | Adamczyk | H04L 69/18 709/223 |
| 2007/0293216 A1* | 12/2007 | Jiang | 455/433 |

FOREIGN PATENT DOCUMENTS

| | | |
|---|---|---|
| WO | 0122657 A1 | 3/2001 |
| WO | 2004019173 A1 | 3/2004 |

OTHER PUBLICATIONS

Office Action in Canadian Application No. 2,609,942 dated Sep. 9, 2014.

Strater, Jay, et al.; "White Paper—Seamless Mobility Between Home Networks and Cable Services"; Motorola; May 27, 2005; 17 pages.

3GPP TS 24.008 V7.3.0; 3rd Generation Partnership Project; Technical Specification Group Core Network and Terminals; Mobile Radio Interface Layer 3 Specification; Core Network Protocols; Stage 3; Release 7; Mar. 2006; 534 pages.

Office Action dated Aug. 4, 2010; U.S. Appl. No. 11/440,165, filed May 24, 2006; 25 pages.

Office Action dated Feb. 16, 2011; U.S. Appl. No. 11/440,165, filed May 24, 2006; 31 pages.

Final Office Action dated Jun. 22, 2011; U.S. Appl. No. 11/440,165, filed May 24, 2006; 28 pages.

Office Action dated Jan. 19, 2012; U.S. Appl. No. 11/440,165, filed May 24, 2006; 23 pages.

PCT International Search Report; Application No. PCT/IB2006/001362; dated Oct. 5, 2006; 3 pages.

PCT Written Opinion of the International Searching Authority; Application No. PCT/IB2006/001362; dated Oct. 5, 2006; 6 pages.

PCT International Search Report; Application No. PCT/IB2006/000607; dated Aug. 28, 2006; 2 pages.

PCT Written Opinion of the International Searching Authority; Application No. PCT/IB2006/000607; dated Aug. 28, 2006; 5 pages.

PCT International Search Report; Application No. PCT/IB2006/001564; dated Nov. 14, 2006; 2 pages.

PCT Written Opinion of the International Searching Authority; Application No. PCT/IB2006/001564; dated Nov. 14, 2006; 4 pages.

Canadian Office Action; Application No. 2,609,942; dated Jul. 2, 2015; 4 pages.

European Extended Search Report; Application No. 06744764.9; dated Mar. 31, 2016; 7 pages.

Canadian Office Action; Application No. 2,609,942; dated Jan. 4, 2016; 4 pages.

Canadian Office Action; Application No. 2,609,942; dated Sep. 15, 2016; 4 pages.

Canadian Office Action; Application No. 2,609,942; dated Sep. 19, 2017; 6 pages.

Canadian Office Action; Application No. 2,609,942; dated Jul. 19, 2018; 7 pages.

Canadian Office Action; Application No. 2,609,942; dated Nov. 23, 2018; 6 pages.

European Examination Report; Application No. 06744764.9; dated Dec. 10, 2018; 4 pages.

* cited by examiner

CIRCUIT-SWITCHED AND MULTIMEDIA SUBSYSTEM VOICE CONTINUITY WITH BEARER PATH INTERRUPTION

This application claims the benefit of U.S. provisional patent application 60/685,645 filed on May 27, 2005, the disclosure of which is hereby incorporated by reference in its entirety.

FIELD OF THE INVENTION

The present invention relates to communications, and in particular to providing a continuity control function for supporting calls over circuit-switched subsystems and packet subsystems, as well as effecting transfers of established calls from one subsystem to another.

BACKGROUND OF THE INVENTION

Packet communications have evolved to a point where voice sessions, or calls, can be supported with essentially the same quality of service as that provided by circuit-switched communications. Packet communications are generally supported over packet subsystems, which were initially supported by local area networks, but are now supported by wireless local area networks (WLANs). Using WLAN access, user elements can support voice sessions using packet communications while moving throughout the WLAN. As such, WLAN access provides users the same freedom of movement within a WLAN as cellular access provides users within a cellular environment.

In many instances, the coverage areas provided by WLANs and cellular networks are complementary. For example, a WLAN may be established within a building complex in which cellular coverage is limited. Given the localized nature of WLAN coverage, cellular networks could bridge the coverage gaps between WLANs. Unfortunately, WLAN access technology is independent of cellular access technology. Cellular networks generally support circuit-switched communications, and WLANs support packet communications. As such, user elements have been developed to support both cellular and WLAN communications using different communication interfaces. With these user elements, users can establish calls via the cellular network and WLAN using the respective communication interfaces; however, calls established via the cellular network are not easily transferred to the WLAN, and vice versa.

During a transfer of a call from the cellular network to the WLAN, it is preferable to establish a new connection via the WLAN interface of the user element prior to dropping the old connection via the cellular network, and vice versa. Unfortunately, there are a few scenarios where maintaining the old connection in the old subsystem before establishing the new connection in the new subsystem is difficult, if not impossible. For example, the user element may not be able to support cellular and WLAN communications at the same time. Even if the user element is capable of supporting simultaneous cellular and WLAN communications, there may be breaks in coverage during a call as the user element moves from a cellular coverage area to a WLAN coverage area.

Even though breaks may be unavoidable during transfers from one subsystem to another, there would be benefit in reestablishing the voice path for the call via the new subsystem without dropping the call. Although the user may experience a break in communications, there would be no need to initiate a new call. As such, the inconvenience to the user is minimized.

Accordingly, there is a need for a technique to effectively support calls for a user element over both cellular networks and WLANs as well as provide transfers for established calls between the respective networks. There is a further need for a technique to maintain the call, even if a brief break in the actual voice path is required during the transfer due to the configuration of the user element or a break in coverage. The need for such a technique is particularly felt for transfers between packet-based third generation subsystems and circuit-switched subsystems.

SUMMARY OF THE INVENTION

Call control for originating and terminating calls in a circuit-switched subsystem (CS) or a multimedia subsystem (MS) as well as transferring calls between the CS and MS is anchored at a continuity control function (CCF) in the MS. Call signaling for the call is generally passed through the CCF. The CCF is a service provided in the user element's home MS and anchors the user element's active CS calls and MS sessions to enable mobility across the CS and MS while maintaining voice calls and related sessions.

The CCF is configured to maintain calls during transfers between subsystems, even when there is a bearer path interruption at the user element due to the original connection from the transferring-out subsystem being dropped before the new connection in the transferring-in subsystem is established. The bearer path interruption may result in a perceptible delay to the remote party of the call. In essence, the call signaling leg toward the remote endpoint of the remote party is held while the call signaling leg toward the user element is moved from the transferring-out subsystem to the transferring-in subsystem and a new bearer path is established with the user element via the transferring-in subsystem. During transfers where there will be a bearer path interruption, the CCF will effectively connect the portion of the bearer path leading to the remote endpoint to a media resource function, which will provide an appropriate and related announcement to the remote party over the bearer path. Once the user element is accessible in the transferring-in subsystem, the relevant portion of the bearer path is transferred to the user element via the transferring-in subsystem.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

DETAILED DESCRIPTION OF PREFERRED EMBODIMENTS

Figure 1:
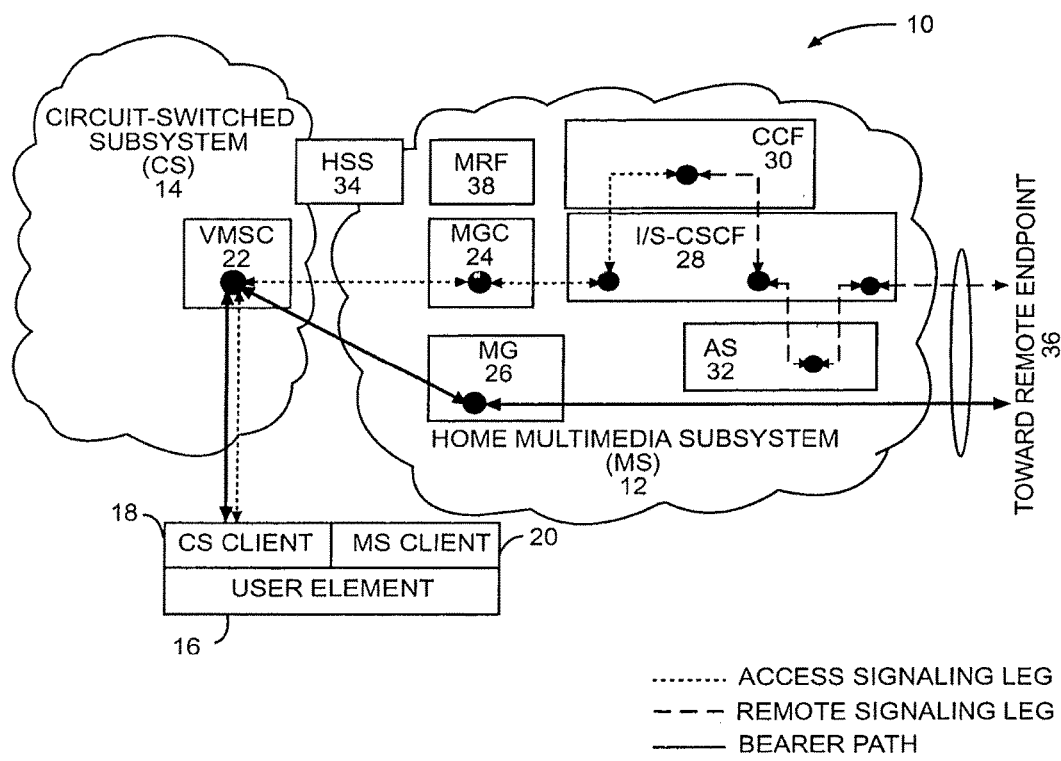
FIG. 1 is a communication environment illustrating circuit-switched subsystem access for a user element according to one embodiment of the present invention.

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The present invention moves service control, including call control, for a user element from a cellular network to a multimedia subsystem (MS), such as the Internet Protocol (IP) Multimedia Subsystem (IMS). As such, call control is provided by the MS irrespective of whether the user element is using cellular or WLAN access for the call. For clarity and conciseness, a cellular network providing circuit-switched communications is referred to as a circuit-switched subsystem (CS), and a WLAN providing packet communications is assumed to be part of or associated with the MS. In general, wireless communication techniques having relatively limited range, such as WLAN techniques, are referred to as local wireless communication techniques. Thus, local wireless communication techniques support packet-based communications, wherein cellular communication techniques will generally support circuit-switched communications. Further, wireless access for local wireless techniques are of a limited range with respect to cellular access techniques. The invention is particularly beneficial for transfers between packet-based third generation MSs and cellular-based second generation CSs.

Call control for originating and terminating calls in the CS or MS as well as transferring calls between the CS and MS is anchored at a continuity control function (CCF) in the MS. Call signaling for the call is generally passed through the CCF. The CCF is a service provided in the user element's home MS and anchors the user element's active CS calls and MS sessions to enable mobility across the CS and MS while maintaining CS calls or MS calls.

Notably, the CCF is configured to maintain calls during transfers between subsystems, even when there is a bearer path interruption at the user element due to the original connection from the transferring-out subsystem being dropped before the new connection in the transferring-in subsystem is established. The bearer path interruption results in a perceptible delay to the remote party. In essence, the call signaling leg toward the remote endpoint is held while the call signaling leg toward the user element is moved from the transferring-out subsystem to the transferring-in subsystem, and a new bearer path is established with the user element via the transferring-in subsystem. During transfers where there will be a bearer path interruption, the CCF will effectively connect the portion of the bearer path leading to the remote endpoint to a media resource function, which will provide an appropriate and related announcement to the remote party over the bearer path. Once the user element is accessible in the transferring-in subsystem, the bearer path is further transferred to the user element via the transferring-in subsystem.

For CS calls, the CCF operates to anchor the bearer path for calls originated or terminated through the CS by the user element at a media gateway, which is controlled by a media gateway controller of the home MS. Although the media gateway belongs to the home MS, the media gateway is preferably located in close proximity to the CS to save backhaul costs. In one embodiment, the CCF employs a Third Party Call Control function to provide call control in the CS. For MS calls, the CCF provides call control by interacting with the user element and a remote endpoint to establish a bearer path directly between the user element and the remote endpoint through the MS.

The CCF is addressable using public service identities (PSI). In the CS, a directory number associated with the CCF is used for routing call signaling messages within the CS. In the MS, a uniform resource locator (URL) associated with the CCF is used for routing call signaling messages within the MS. In the following description, 3GPP TS 24.008 (DTAP) is used in the CS while the Session Initiation Protocol (SIP) is used in the MS to effect origination, termination, and transfer of calls. Those skilled in the art will recognize other applicable and useful protocols as substitutes for DTAP and SIP.

Turning now to FIG. 1, a communication environment 10 is illustrated according to one embodiment of the present invention. In the communication environment 10, a home MS 12 and a visited CS 14 support communications for a user element 16. The user element 16 includes a CS client 18 and an MS client 20, which are configured to support circuit-switched communications via the CS 14 as well as packet communications via the MS 12, respectively. For communications within the CS 14, a visited mobile switching center (VMSC) 22 will support circuit-switched communications for the user element 16. The VMSC 22 may interact with the home MS 12 via a media gateway controller (MGC) 24 and an associated media gateway (MG) 26, both of which are affiliated with the MS 12.

The home MS 12 may include various functions or entities, including an interrogating and serving call/session control function (I/S-CSCF) 28, a CCF 30, an application server (AS) 32, a home subscriber service (HSS) 34, and a media resource function (MRF) 38. Notably, the interrogating CSCF provides the standard I-CSCF functions and the serving CSCF provides standard S-CSCF functions. These functions are represented in the I/S-CSCF 28 for conciseness. Further, the HSS 34 may have a presence in both the CS 14 and the MS 12. The HSS 34 may include a home location resource component for a home CS of the user element 16.

Call/session control functions (CSCFs) in the home MS 12 generally act as SIP proxies and provide various functions in association with call control, as will be appreciated by those skilled in the art. In operation, an interrogating CSCF (I-CSCF) may interact with the HSS 34 to identify the serving CSCF (S-CSCF), which will be assigned to support a given user element. For the present invention, the HSS 34 may maintain an association between a user element 16 and a particular CCF 30 that is assigned to the user element 16. As such, the HSS 34 will assist in identifying a serving CSCF for the user element 16, as well as keep an association between a particular CCF 30 and the user element 16. The CCF PSI for the user element 16 may be provisioned in the user element 16 to enable the user element 16 to initiate transfers and the like controlled by the CCF 30. Alternatively, the CCF PSI may be transferred to the user element upon network registration.

Depending on whether the user element 16 is registered in the MS 12, different techniques may be used to access the MS 12. When the user element 16 is registered in the MS network 12, the user element 16 will have an S-CSCF assigned to it, and will use that S-CSCF to access the CCF 30. When the user element 16 is not registered in the MS network 12, a temporary S-CSCF may be assigned to the user element 16, and the temporary S-CSCF will be used to access the CCF 30.

The application servers 32 may be invoked and placed within the call signaling path to implement any number of features or services. When a particular application service provided by an application server 32 is invoked, all signaling for the associated call or session is passed through the application server 32, which has the opportunity to process call signaling messages as necessary to implement the desired service. Notably, the CCF 30 acts like a service, and as such, the I/S-CSCF 28 will operate to pass all call signaling messages for the call through the CCF 30, thereby allowing the CCF 30 to act as an anchor for the call.

The MRF 38 is a function that is capable of establishing a bearer path leading to the user element 16 or the remote endpoint 36 and supporting user interactions via the bearer path. For example, the MRF 38 may be configured to provide interactive voice or dual-tone multi-frequency (DTMF) automation to receive input from and provide information to users of the user element 16. For the present invention, the MRF 38 may be employed by the CCF 30 to provide announcements for the remote party associated with the remote endpoint 36 during bearer path interruptions, which are caused by transferring the call from a transferring-out subsystem to a transferring-in subsystem for the user element 16.

In FIG. 1, the user element 16 is engaged in a call supported by the CS client 18 and controlled by the CCF 30. As such, call signaling for the call passes through the VMSC 22, media gateway controller 24, I/S-CSCF 28, CCF 30, and perhaps application server 32, if a service is invoked on its way toward a remote endpoint 36. Notably, the access signaling leg, which is provided by the CS 14, is anchored at the CCF 30 and extends through the I/S-CSCF 28, media gateway controller 24, VMSC 22, and CS client 18 of the user element 16. The remote signaling leg toward the remote endpoint 36 is anchored in the CCF 30 and extends through the I/S-CSCF 28 and the application server 32. In this configuration, the CCF 30 can maintain control of the call and provide any necessary call processing during the call. Further, if a call transfer is required, the CCF 30 maintains the remote signaling leg and establishes a new access signaling leg.

The bearer path for the call illustrated in FIG. 1 extends from the CS client 18 through the VMSC 22 and media gateway 26 on its way toward the remote endpoint 36. Notably, the media gateway controller 24 cooperates with the media gateway 26 such that a circuit-switched connection may be established between the media gateway 26 and the CS client 18 via the VMSC 22. The packet session may be established for the call from the media gateway 26 through the home MS 12 toward the remote endpoint 36.

Figure 2:
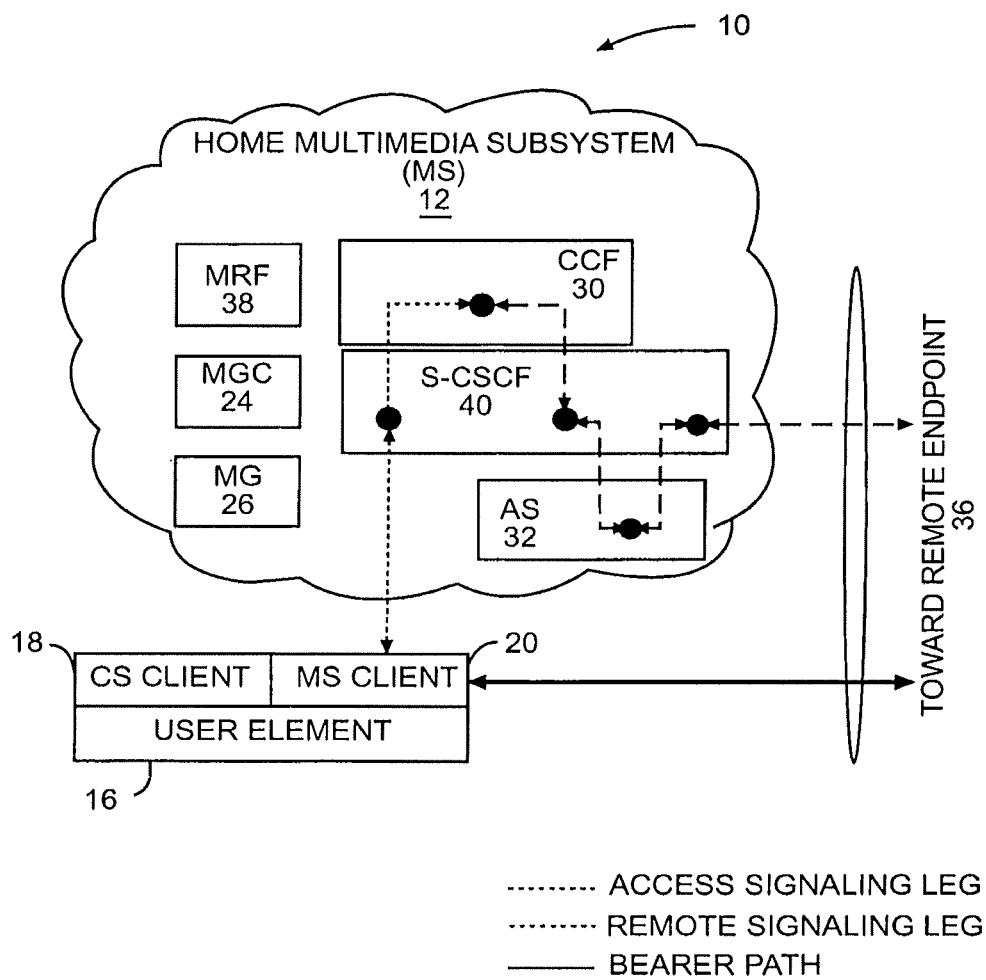
FIG. 2 is a communication environment illustrating multimedia subsystem access for a user element according to one embodiment of the present invention.

With reference to FIG. 2, a call supported by the MS client 20 of the user element 16 is represented. Notably, the call does not extend through the CS 14, and will not employ the services of the VMSC 22, media gateway controller 24, or media gateway 26. Instead, the MS client 20 will support call signaling directly with the MS 12, and in particular with the CCF 30 via a serving-CSCF (S-CSCF) 40. Notably, the I/S-CSCF 28 and the S-CSCF 40 may represent the same CSCF or different CSCFs, depending on how the user element 16 registers with the MS 12.

As illustrated, call signaling is anchored in the CCF 30, wherein an access signaling leg is provided between the CCF 30 and the MS client 20 via the S-CSCF 40. A remote signaling leg is supported between the remote endpoint 36 and the CCF 30 via the S-CSCF 40 and any desired application servers 32 that may provide additional services in association with the call. The bearer path will extend from the MS client 20 toward the remote endpoint 36 via the MS 12, without traveling through the CS 14 (FIG. 1). Again, the CCF 30 anchors the call, such that if a transfer is required, the remote signaling leg toward the remote endpoint 36 can be maintained, while the access signaling leg may be changed to facilitate the transfer from the home MS 12 to the CS 14, as will be described further below. For transfer of calls between the CS 14 and the MS 12, the access signaling legs illustrated in FIGS. 1 and 2 will be changed to support the transfer, while the remote signaling leg is maintained by the CCF 30.

Subsystem transfers enable the user element 16 to move between the CS 14 and the MS 12 while maintaining one or more active calls (voice sessions). Although the call signaling is maintained during a transfer, the transfer may cause an interruption in the bearer path. Call transfers associated with a given call, including initial and subsequent transfers, are executed and controlled in the home MS 12 by the CCF 30, upon a request received from the user element 16. To enable such transfers, the CCF 30 is inserted into the signaling path of the calls by the S-CSCF 40 or the I/S-CSCF 28. To anchor the signaling path, the CCF 30 will employ a back-to-back user agent function (B2BUA), which may operate as follows. When the user element 16 originates a call, the CCF 30 will terminate an access signaling leg from the user element 16 and establish a remote signaling leg toward the remote endpoint 36. When terminating a call at the user element 16, the CCF 30 will terminate a remote signaling leg from the remote endpoint 36 and establish an access signaling leg toward the user element 16. Subsequently, the CCF 30 will coordinate call signaling between the access signaling leg and the remote signaling leg for the call.

When the user element 16 is originating a call, the CCF 30 appears as a service provided by an application server, such as the application server 32. In one embodiment, the CCF 30 is invoked as the first service in a chain of services. When the user element 16 is terminating a call, the CCF 30 is invoked as the last service in a chain of services. By locating the CCF 30 with respect to the other services in this manner, other applications associated with the call are anchored by the CCF 30 as part of the remote signaling leg of the call, and are therefore not impacted by transfers affecting the access signaling leg.

Upon detecting conditions requiring a transfer, the user element 16 will establish an access signaling leg with the CCF 30 using the CS PSI or MS PSI for the CCF 30. The access signaling leg is established via the transferring-in subsystem to request a transfer to the transferring-in subsystem. The CCF 30 will execute a subsystem transfer procedure by replacing the access signaling leg in the transferring-out subsystem currently communicating to the remote signaling leg with the access signaling leg established via the transferring-in subsystem. The CCF 30 will subsequently release the access signaling leg that was established through the transferring-out subsystem.

The switch of the access signaling legs from the transferring-out subsystem to the transferring-in subsystem will generally not impact the remote signaling leg or the application services in the remote signaling leg. Through the access signaling leg in the transferring-in subsystem and the remote signaling leg, the appropriate bearer path may be established to the user element 16 via the appropriate CS client 18 or MS client 20. Since all call signaling is provided through the CCF 30, additional services may be associated with the call through any number of transfers. Further details are provided in association with the following communication flows.

In one embodiment of the present invention, the MSISDN or other user element identifier is owned and controlled by the MS 12 to enable anchoring of incoming calls intended for the user element 16 at the CCF 30. Incoming calls destined for the user element 16 and originated from the CS 14, the public switched telephone network (PSTN), or other MS can be anchored at the CCF 30 by setting up routing functions at the originating service nodes, such that incoming calls intended for the user element 16 are delivered to the home MS 12. As such, the CCF 30 can take the necessary steps to find the user element 16 and route the call to the user element 16, even if the user element 16 is in the CS 14 when the call arrives.

As indicated, the HSS 34 may store filter criteria associated with the CCF 30 as part of the user element's subscription profile. The CCF filter criteria is downloaded to the currently assigned I/S-CSCF 28 as part of the initial filter criteria to use when the user element 16 registers with the MS 12. This filter criteria is generally executed at the S-CSCF 28 upon initiation of a call or session from the user element 16 or upon receipt of an incoming session intended for the user element 16. The filter criteria will instruct the I/S-CSCF 28 to invoke the CCF 30 to control at least the bearer path for the call or session.

For the following communication flows, the Session Initiation Protocol (SIP) is employed. Those skilled in the art will recognize that other session establishment and control protocols may be employed to implement the concepts of the present invention.

Figure 3A:
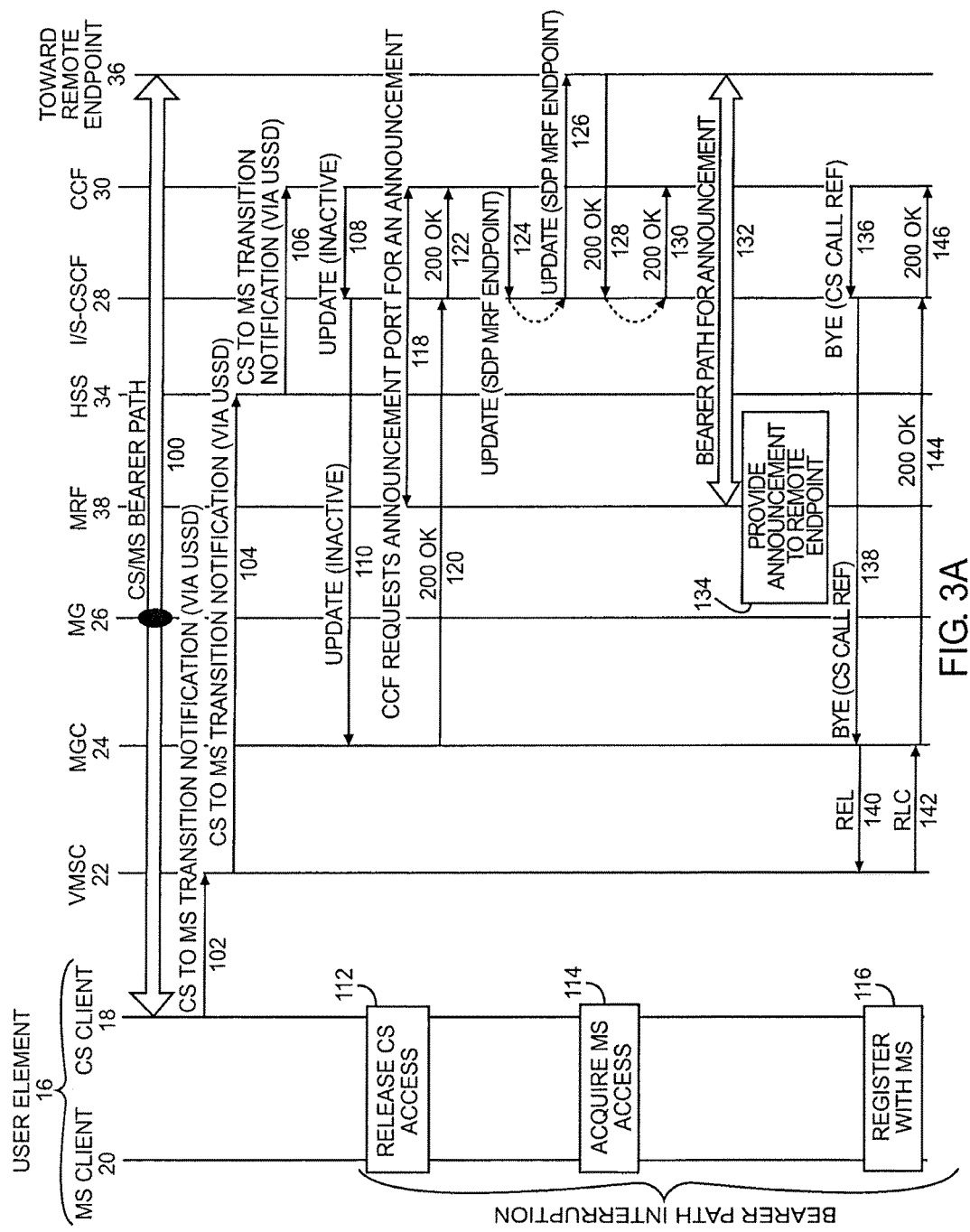
FIGS. 3A and 3B show a communication flow illustrating the transfer of a call from the circuit-switched subsystem to the multimedia subsystem according to a first embodiment of the present invention.
Figure 3B:
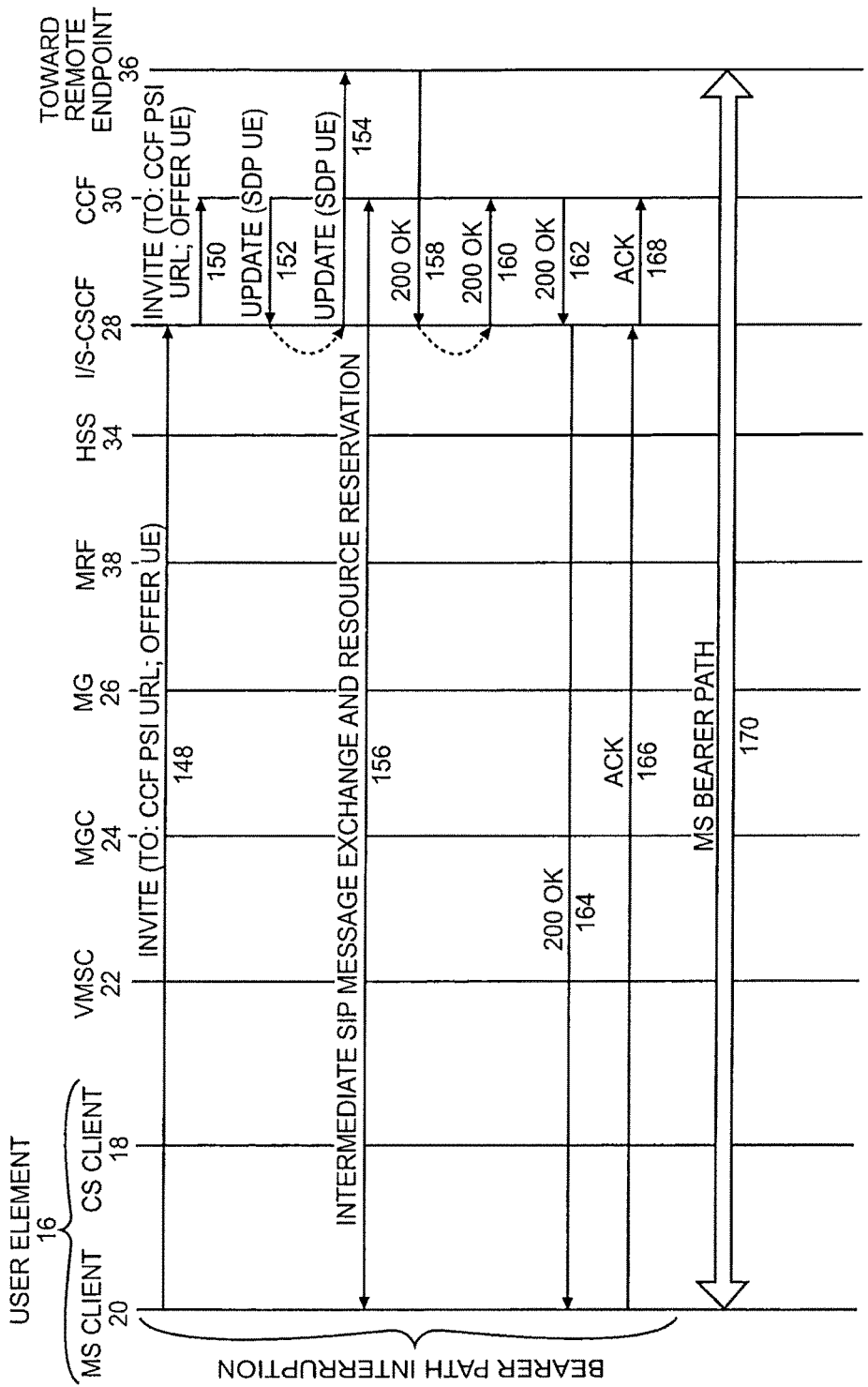

With reference to FIGS. 3A and 3B, a communication flow diagram is provided where an initial bearer path between a remote endpoint 36 and the CS client 18 of the user element 16 is established through the media gateway 26 (step 100). As such, the user element 16 is currently served by the CS 14. In this embodiment, assume the CS 14 is a second generation (2G) cellular network, which can only support voice communications using circuit-switched techniques, and if packet communications are available, there is insufficient bandwidth to support voice applications. Further assume that the user element 16 is moving from an area covered by the CS 14 to an area covered by the MS 12. In this embodiment, the MS 12 is a third generation (3G) packet data network, which is capable of supporting packet communications, and the packet communications are capable of supporting voice applications. Accordingly, communications for the existing call must be transferred from the 2G CS 14 to the 3G MS 12.

The user element 16 may initiate the transition from the CS 14 to the MS 12 by sending a notification toward the MS 12 to indicate that the user element 16 needs to transition from the CS 14 to the MS 12 (step 102). The notification may take many forms, such as a Unstructured Supplementary Service Data (USSD) message, which is first received by the VMSC 22 and forwarded to the CCF 30 directly or indirectly via the HSS 34 (steps 104 and 106). Alternatively, SIP may be used in the lower data rate packet side of the CS 14.

At this point, the CCF 30 will initiate numerous actions. The CCF 30 will send an Update message to the media gateway controller 24 via the I/S-CSCF 28 to indicate that a transition is taking place, and that the circuit-switched connection via the CS 14 is going inactive (steps 108 and 110). In particular, the Update message will inform the media gateway controller 24 that the transition of the user element 16 from the CS 14 to the MS 12 may include an inactive period where there may be a bearer path interruption. After the user element 16 sends the transition notification to the CCF 30, the user element 16 will release communication access to the CS 14 (step 112) and acquire access to the MS 12 (step 114). Once access to the MS 12 is obtained, the MS client 20 will register with the MS 12 (step 116).

The CCF 30 will then interact with the MRF 38 to request an announcement port for a select announcement to be provided to the remote endpoint 36 (step 118). The announcement may be a pre-recorded voice announcement to instruct the remote party that she is experiencing a temporary service interruption, which will be quickly remedied. In the meantime, the media gateway controller 24 will respond to the Update message by sending a 200 OK message back to the CCF 30 via the WS-CSCF 28 (steps 120 and 122). Upon receipt of the 200 OK message, the CCF 30 will take the necessary steps to connect the remote endpoint 36 to the MRF 38, such that a bearer path can be established between the MRF 38 and the remote endpoint 36 to facilitate delivery of the announcement to the remote party. As such, the CCF 30 will send an Update message identifying the MRF 38 as an endpoint for the SIP session to be established between the remote endpoint 36 and the MRF 38 (step 124). The communication information may be provided in the Session Description Protocol (SDP). The I/S-CSCF 28 will forward the Update message toward the remote endpoint 36 (step 126). In response, the I/S-CSCF 28 will receive a 200 OK message originated from the remote endpoint 36 and will forward the 200 OK message to the CCF 30 (steps 128 and 130). At this point, the MRF 38 and the remote endpoint 36 have sufficient information to establish a SIP session therebetween to form a bearer path for the announcement (step 132). Once the bearer path for the announcement is established, the MRF 38 will provide the announcement to the remote endpoint 36 (step 134).

The CCF 30 will then take the necessary steps to release the circuit-switched portion of the bearer path that extends between the media gateway 26 and the CS client 18 via the VMSC 22. The CCF 30 will send a Bye message with the CS call reference information (REF) to the media gateway controller 24 via the I/S-CSCF 28 (steps 136 and 138). In response, the media gateway controller 24 will send a Release message (REL) to the VMSC 22 (step 140), which will respond with a Release Complete message (RLC) (step 142). The media gateway controller 24 will coordinate with the media gateway 26 to clear its circuit-switched resources, and send a 200 OK message back to the CCF 30 via the I/S-CSCF 28 to confirm release of the resources in the CS 14 (steps 144 and 146).

Once the MS client 20 of the user element 16 is registered with the MS 12, an Invite is sent to the CCF 30 using the CCF PSI URL via the I/S-CSCF 28 (steps 148 and 150). The Invite essentially offers the MS client 20 of the user element 16 as the endpoint to which a bearer path should be established. The CCF 30 will respond to the Invite by sending an Update message toward the remote endpoint 36 to indicate that the bearer path for the call should be established with the MS client 20 of the user element 16 (steps 152 and 154). The CCF 30 and the MS client 20 of the user element 16 will provide the requisite intermediate SIP message exchange and resource reservation handshaking to prepare for communications with the remote endpoint 36 (step 156). All or certain of the messages in the message exchange may be relayed back and forth between the CCF 30 and the remote endpoint 36 as necessary. In response to the Update message, the CCF 30 will receive a 200 OK message from the remote endpoint 36 via the I/S-CSCF 28 (steps 158 and 160). The CCF 30 will forward the 200 OK message to the MS client 20 via the I/S-CSCF 28 (steps 162 and 164). The MS client 20 will acknowledge receipt of the 200 OK message by sending an Acknowledgement to the CCF 30 via the I/S-CSCF 28 (steps 166 and 168). At this point, an MS bearer path is established between the MS client 20 and the remote endpoint 36, or an MS element which is serving as a gateway to the remote endpoint 36 (step 170).

From the above, the CCF 30 will orchestrate the transition of the bearer path from the CS client 18 of the user element 16 to the MRF 38 for delivery of an announcement to the remote party. After the announcement is delivered and the MS client 20 of the user element 16 is registered with the MS 12, a bearer path is further transitioned to the MS client 20 of the user element 16 via the MS 12. Although there is a bearer path interruption to the user element 16, call signaling remains anchored in the CCF 30, the connection toward the remote endpoint 36 is maintained, and an announcement is provided to the remote party to inform the remote party that the transition is occurring.

In contrast with FIGS. 3A and 3B, FIGS. 4A and 4B provide a communication flow where a call is initially established from an MS client 20 of the user element 16 toward the remote endpoint 36 via the MS 12. After the call has been established via the MS 12, the user element 16 will recognize the need to transition from the MS 12 to the CS 14. To initiate the transition, the MS client 20 of the user element 16 will send a Notify message to the CCF 30 via the I/S-CSCF 28 (steps 202 and 204). The CCF 30 will recognize the need for the transition, and respond by sending a 200 OK message to the MS client 20 of the user element 16 via the I/S-CSCF 28 (steps 206 and 208). The CCF 30 will send an Update toward the remote endpoint 36 via the I/S-CSCF 28 to indicate that the MS bearer path will become inactive (steps 210 and 212).

In the meantime, the user element 16 will release MS access (step 214), acquire CS access (step 216), and register with the CS 14 (step 218). While the user element 16 is releasing MS access, acquiring CS access, and registering with the CS 14, the CCF 30 will communicate with the MRF 38 to request an announcement port for a given announcement to be provided to the remote party of the remote endpoint 36 (step 220). In response to the Update message, the CCF 30 will receive a 200 OK message from the remote endpoint 36 via the I/S-CSCF 28 (steps 222 and 224). The CCF 30 will send another Update message toward the remote endpoint 36 via the I/S-CSCF 28 to identify the MRF 38 as the endpoint with which communications are to be established for the call (steps 226 and 228). The communication parameters for the MRF 38 will be provided in the SDP information of the Update message. In response, the CCF 30 will receive a 200 OK message via the I/S-CSCF 28 from the remote endpoint 36 or the supporting gateway (step 230 and 232). At this point, a bearer path for the announcement may be established between the MRF 38 and the remote endpoint 36 (step 234). Once the bearer path for the announcement is established, the MRF 38 will provide the announcement to the remote endpoint 36 via the bearer path (step 236).

The CCF 30 may send a Bye message, in traditional SIP fashion, toward the remote endpoint 36 via the I/S-CSCF 28 (step 238 and 240). In this instance, the Bye message from the I/S-CSCF 28 will not reach the remote endpoint 36 because the MS client 20 of the user element 16 no longer has access to the MS 12, and as such, the Bye message is simply dropped.

Once the CS client 18 of the user element 16 is registered with the CS 14, the CS client 18 will send a Setup message to initiate a call to the CCF 30 using the CCF PSI (step 242). The Setup message is received by the serving VMSC 22, which will respond by sending an Initial Address Message (IAM) to the appropriate media gateway controller 24 (step 244), as well as sending a Call Proceeding message back to the CS client 18 of the user element 16 (step 246). The media gateway controller 24 will then send an Invite message to the CCF 30 via the I/S-CSCF 28 using the CCF PSI URL (steps 248 and 250). The Invite will offer the media gateway controller 24, and indirectly the media gateway 26, as an MS endpoint for the call. In response, the CCF 30 will send an Update message offering the media gateway controller 24 as the endpoint for the call toward the remote endpoint 36 via the I/S-CSCF 28 (steps 252 and 254). Next, the intermediate SIP message exchange and resource reservation handshaking may take place between the CCF 30 and the media gateway controller 24, as well as with the remote endpoint 36 (step 256). The CCF 30 will ultimately receive a 200 OK message from the remote endpoint 36 via the I/S-CSCF 28 (steps 258 and 260), and forward the 200 OK message to the media gateway controller 24 (steps 262 and 264). The media gateway controller 24 will respond to the 200 OK message by sending an Address Complete Message (ACM) to the VMSC 22 (step 266), which will send an Alerting message to the CS client 18 of the user element 16 (step 268).

To emulate answering the call initiated from the CS client 18 of the user element 16, the CCF 30 will send an Acknowledgement message to the media gateway controller 24 via the I/S-CSCF 28 (steps 270 and 272). The media gateway controller 24 will send an Answer Message (ANM) to the VMSC 22 (step 274), which will send a Connect message to the CS client 18 (step 276), wherein a circuit-switched connection is established between the CS client 18 of the user element 16 and the media gateway 26, and a packet session is established from the media gateway 26 toward the remote endpoint 36. The media gateway 26 will effectively connect the circuit-switched connection and the packet session to form the CS/MS bearer path between the CS client 18 of the user element 16 and the remote endpoint 36, or an appropriate gateway element (step 278).

Figure 5A:
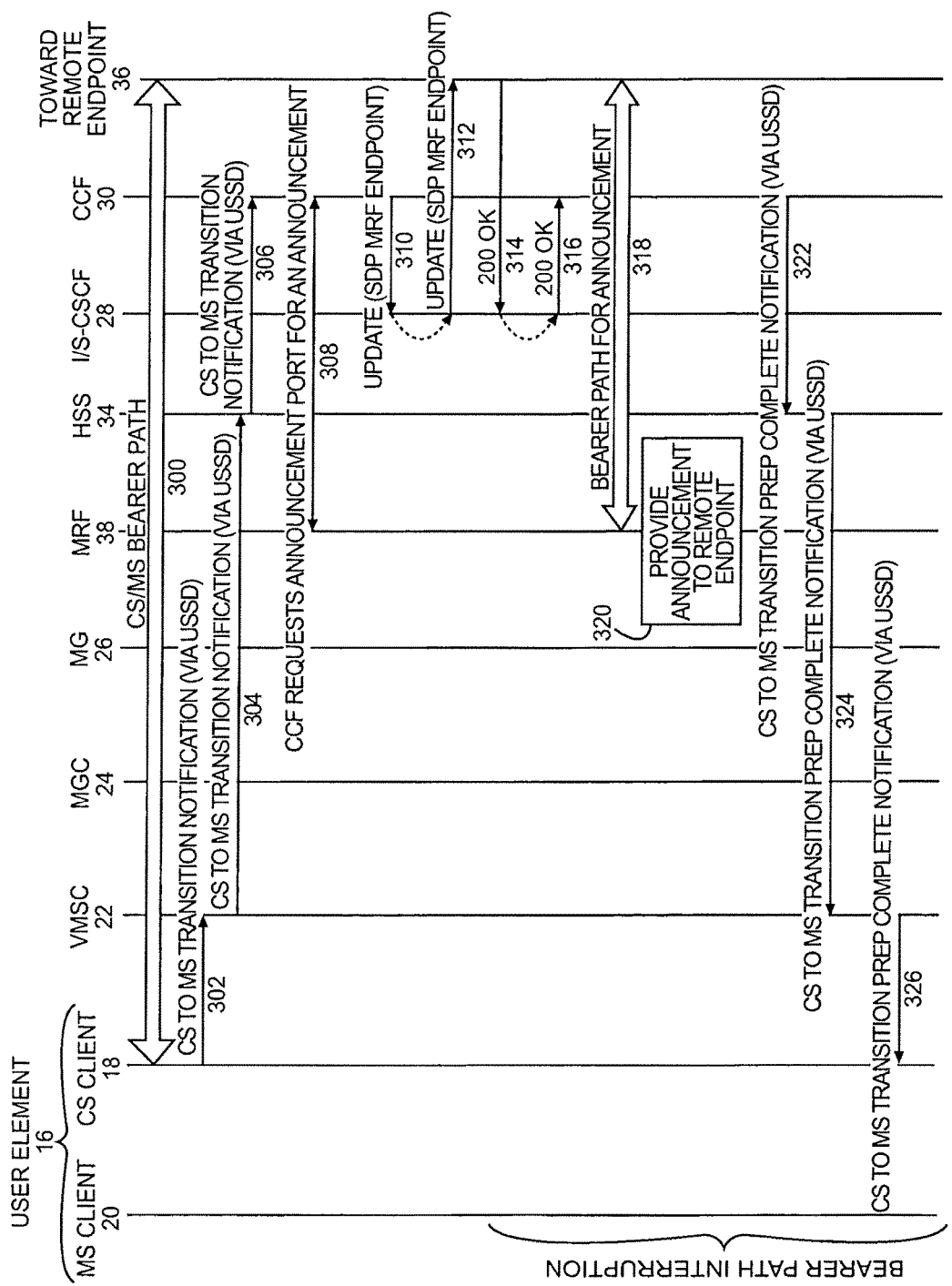
FIGS. 5A and 5B show a communication flow illustrating the transfer of a call from the circuit-switched subsystem to the multimedia subsystem according to a third embodiment of the present invention.
Figure 5B:
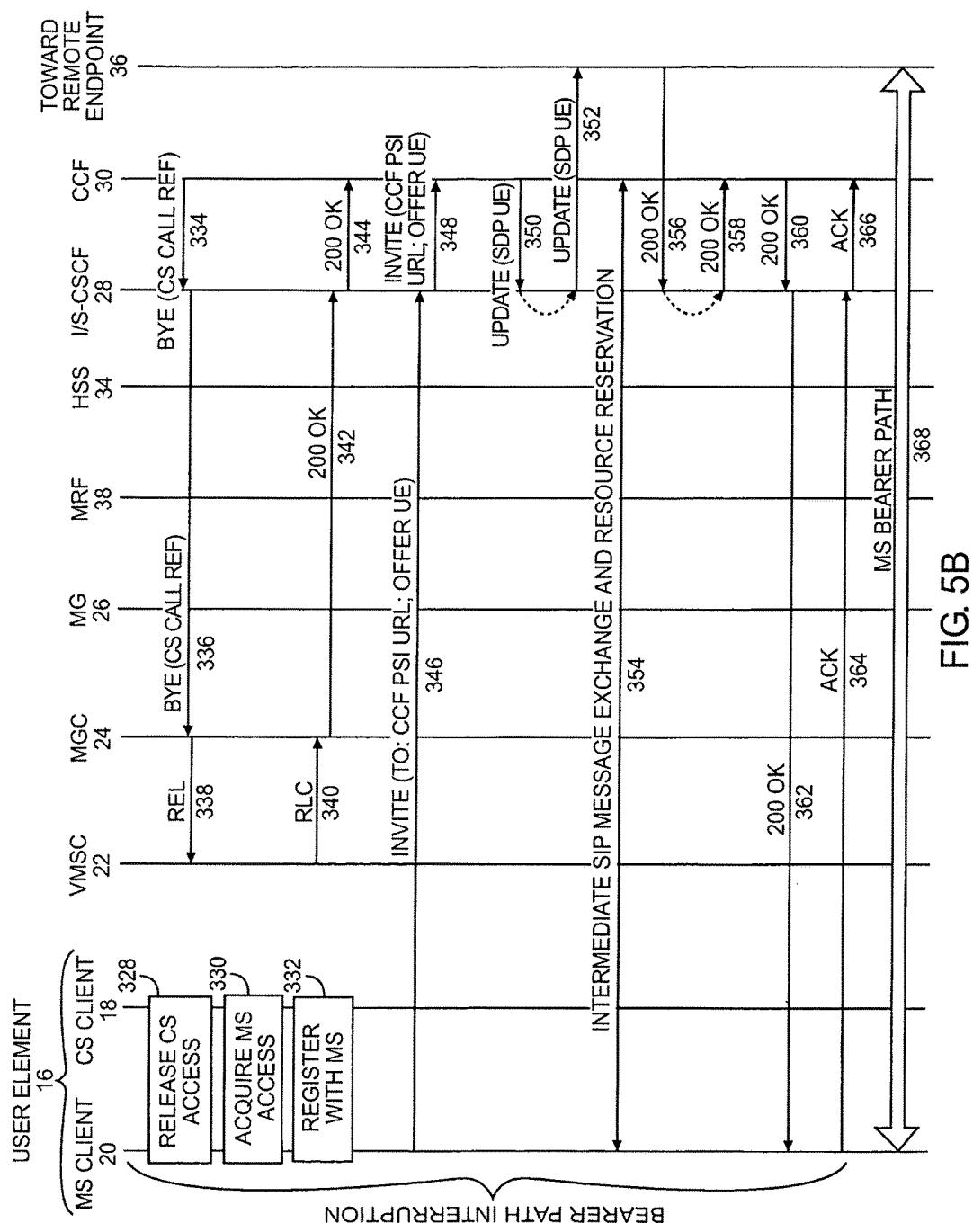

Turning now to FIGS. 5A and 5B, an alternative scenario is provided with respect to the communication flow of FIGS.

3A and 3B. In this embodiment, upon receiving the transition notification from the CS client 18 of the user element 16, the CCF 30 will send a special message back to the CS client 18 of the user element 16 to indicate that the announcement for the remote party is being provided in response to the service interruption. In this embodiment, the CS client 18 will maintain CS access, if possible, until receipt of the message from the CCF 30 indicating that the remote user is being provided the appropriate announcement.

Initially, assume a call is established over a CS/MS bearer path between the CS client 18 of the user element 16 toward a remote endpoint 36 (step 300). The CS portion of the bearer path is established between the CS client 18 and the media gateway 26, whereas the MS portion of the bearer path is established between the media gateway 26 and the remote endpoint 36, or an appropriate gateway leading to the remote endpoint 36. Again, the CS client 18 of the user element 16 will send a CS-to-MS transition notification, perhaps using USSD messaging techniques, to the CCF 30 via the VMSC 22 and the HSS 34 (steps 302, 304, and 306). The CCF 30 will interact with the MRF 38 to request an announcement port and identify an announcement to be sent to the remote party via the remote endpoint 36 (step 308). To establish the bearer path for the announcement, the CCF 30 will send an Update message identifying the MRF 38 as an endpoint for communications toward the remote endpoint 36 via the I/S-CSCF 28 (steps 310 and 312). The Update message will include the SDP information for the MRF endpoint 38, such that communications between the MRF 38 and the remote endpoint 36 or supporting gateway may be facilitated. The CCF 30 will receive a 200 OK message in response to the Update message via the I/S-CSCF 28 (steps 314 and 316). At this point, a bearer path for the announcement is established from the MRF 38 toward the remote endpoint 36 (step 318), and the MRF 38 will provide the selected announcement to the remote endpoint 36 (step 320).

Once the CCF 30 recognizes that the announcement is or will be provided to the remote party at the remote endpoint 36, a notification is provided to the CS client 18 of the user element 16 via the HSS 34 and I/S-CSCF 28 to indicate that preparation for the transition is complete (steps 322, 324, and 326). At this point, the user element 16 will take the necessary steps to release CS access (step 328), acquire MS access (step 330), and register with the MS 12 (step 332). Again, acquiring and releasing CS or MS access entails obtaining communication resources or releasing communication resources for the respective subsystem.

The CCF 30 will next take the necessary steps to release the resources in the CS 14 by sending a Bye message identifying the call using the CS call reference information to the media gateway controller 24 via the I/S-CSCF 28 (steps 334 and 336). The media gateway controller 24 will then send a Release message to the VMSC 22 (step 338), which will respond with a release complete message (step 340). The media gateway controller 24 will then send a 200 OK message to the CCF 30 via the I/S-CSCF 28 (steps 342 and 344).

Once the MS client 20 of the user element 16 is registered with the MS 12, an Invite is sent to the CCF 30 using the CCF PSI URL via the WS-CSCF 28 (steps 346 and 348). The Invite essentially offers the MS client 20 of the user element 16 as the endpoint to which a bearer path should be established. The CCF 30 will respond to the Invite by sending an Update message toward the remote endpoint 36 to indicate that the bearer path for the call should be established with the MS client 20 of the user element 16 (steps 350 and 352). The CCF 30 and the MS client 20 of the user element 16 will provide the requisite intermediate SIP message exchange and resource reservation handshaking to prepare for communications with the remote endpoint 36 (step 354). All or certain of the messages in the message exchange may be relayed back and forth between the CCF 30 and the remote endpoint 36 as necessary. In response to the Update message, the CCF 30 will receive a 200 OK message from the remote endpoint 36 via the I/S-CSCF 28 (steps 356 and 358). The CCF 30 will forward the 200 OK message to the MS client 20 via the I/S-CSCF 28 (steps 360 and 362). The MS client 20 will acknowledge receipt of the 200 OK message by sending an Acknowledgement to the CCF 30 via the I/S-CSCF 28 (steps 364 and 366). At this point, an MS bearer path is established between the MS client 20 and the remote endpoint 36, or an MS element which is serving as a gateway to the remote endpoint 36 (step 368).

Figure 4A:
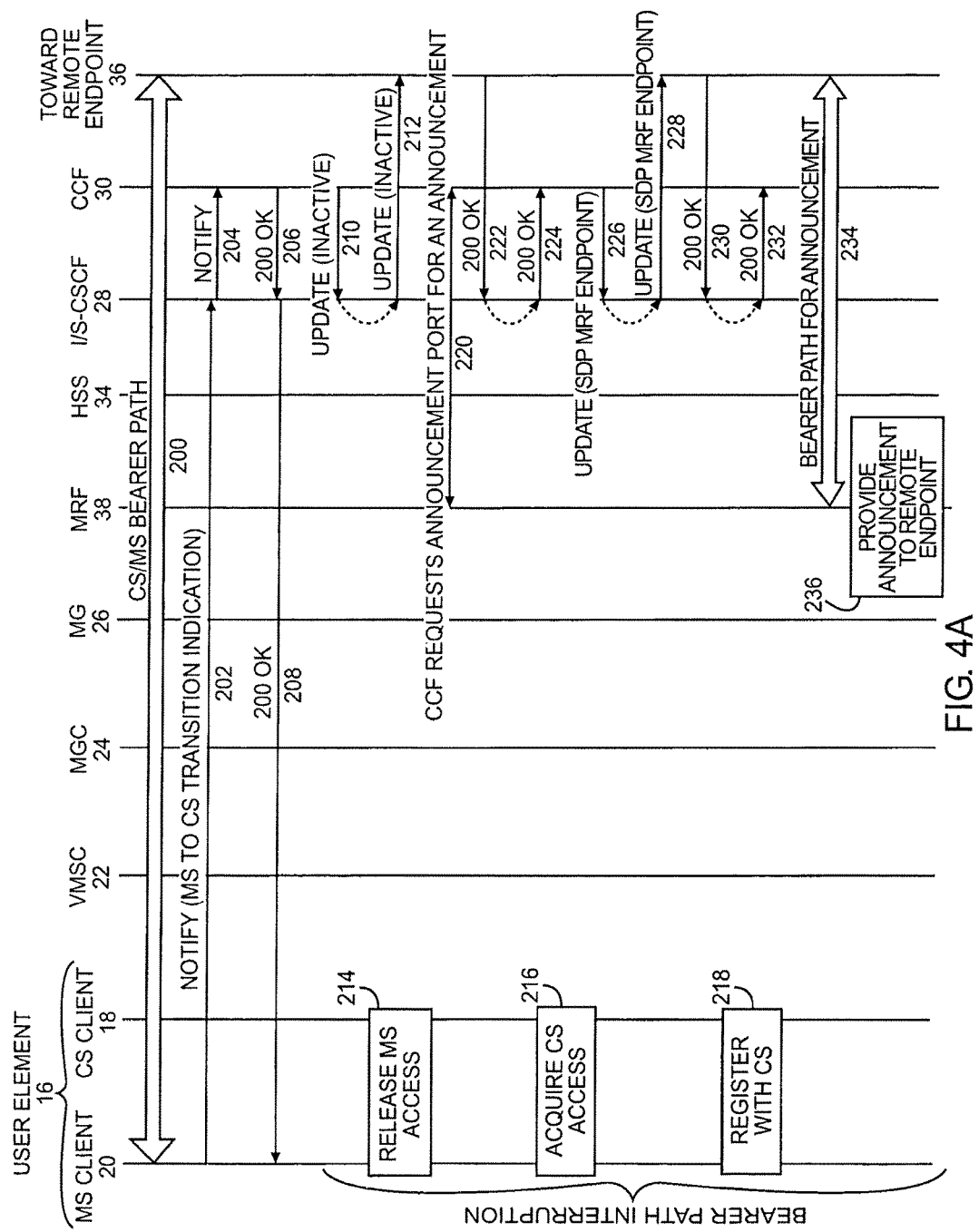
FIGS. 4A and 4B show a communication flow illustrating the transfer of call from the multimedia subsystem to the circuit-switched subsystem according to a second embodiment of the present invention.
Figure 4B:
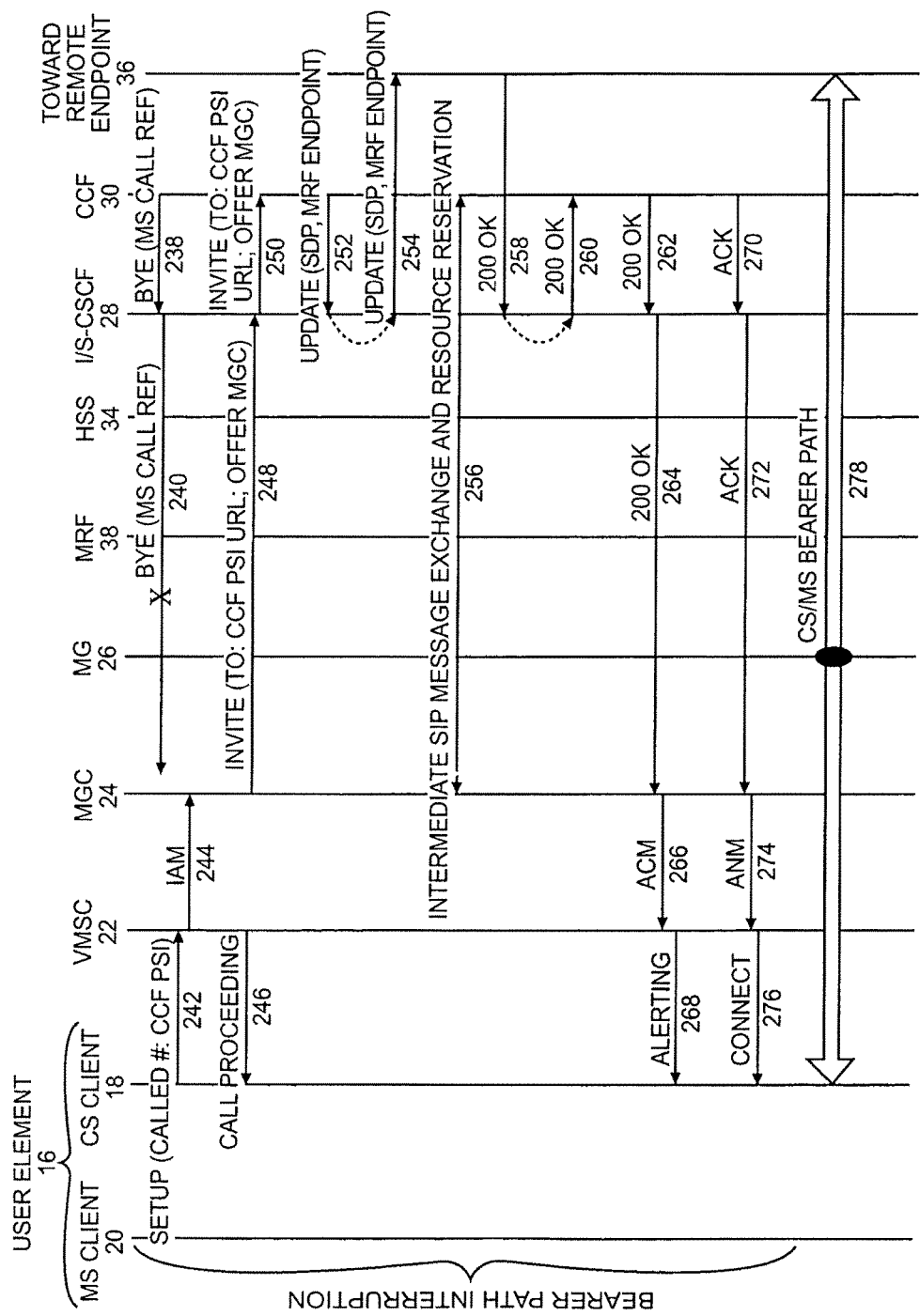
Figure 6A:
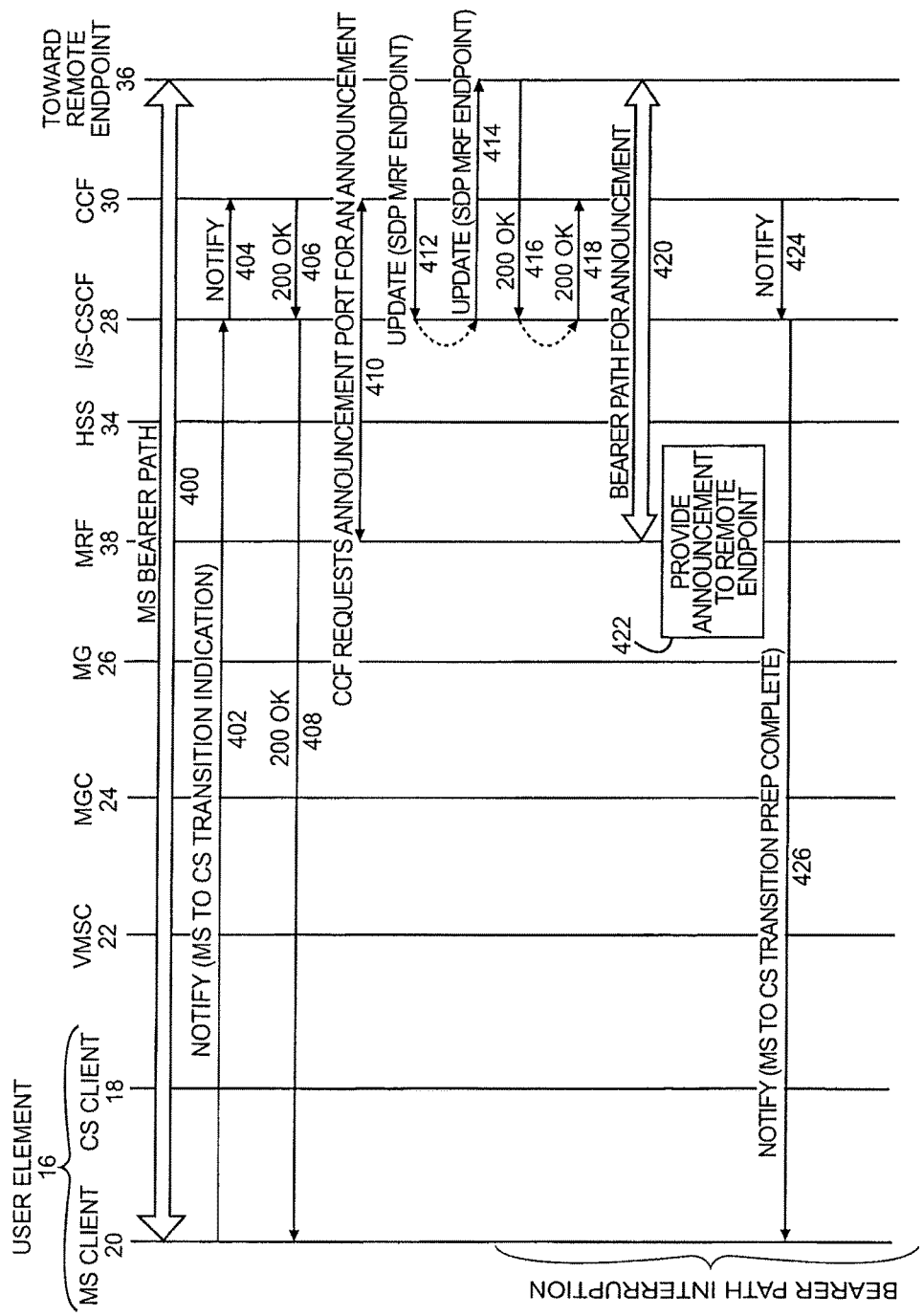
FIGS. 6A and 6B show a communication flow illustrating the transfer of a call from the multimedia subsystem to the circuit-switched subsystem according to a fourth embodiment of the present invention.
Figure 6B:
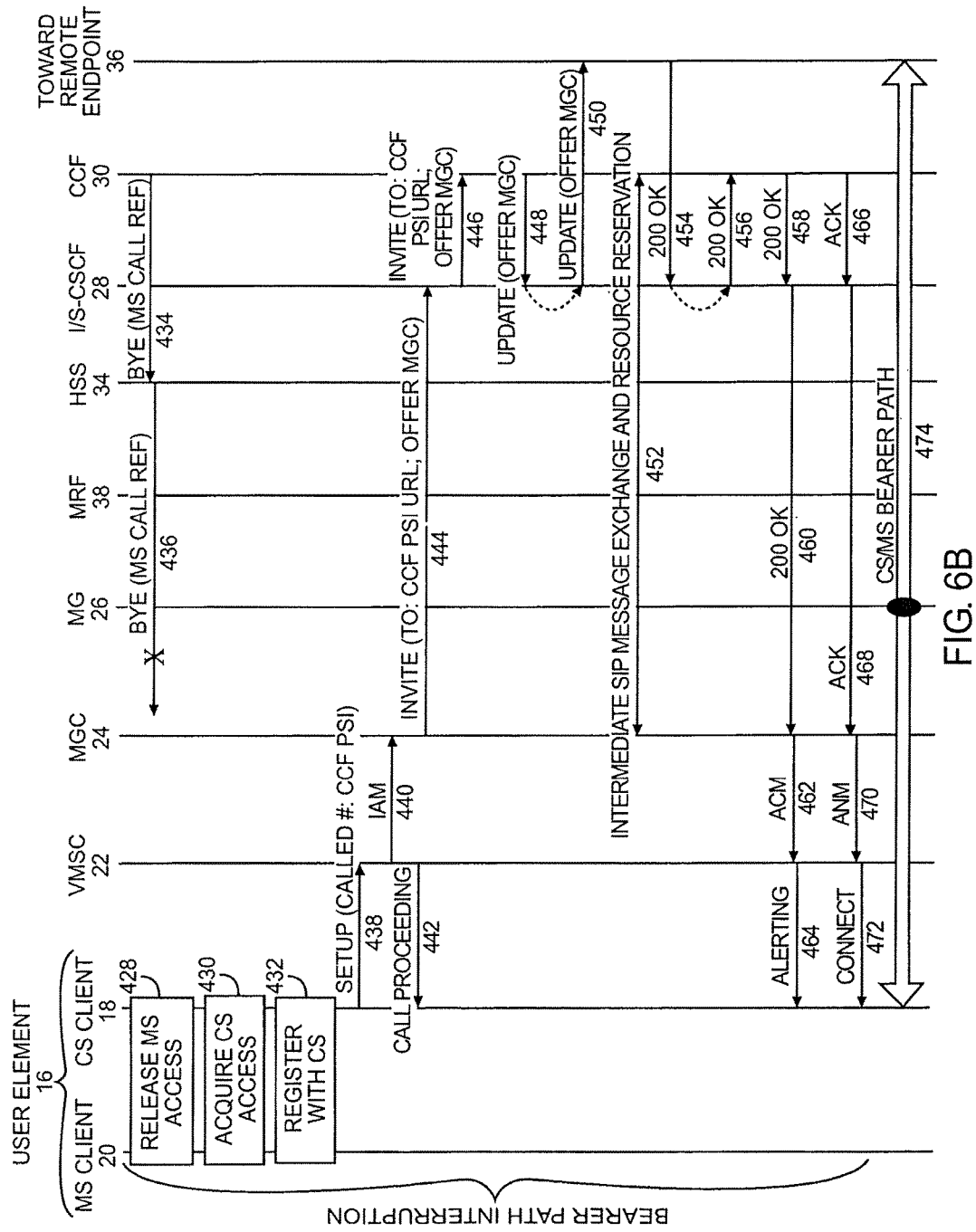

With reference to FIGS. 6A and 6B, a communication flow is provided for an alternative scenario to that illustrated in FIGS. 4A and 4B. In particular, the CCF 30 will alert the user element 16 that an announcement is being provided to the remote user. The user element 16 will wait until receipt of this alert before releasing MS access, acquiring CS access, and registering with the CS.

Initially, an MS bearer path is established from the MS client 20 of the user element 16 toward the remote endpoint 36 (step 400). When the user element 16 determines that there is a need to transition from the MS 12 to the CS 14, the MS client 20 will send a Notify message to the CCF 30 via the I/S-CSCF 28 indicating that the transition from the MS 12 to the CS 14 is necessary (steps 402 and 404). The CCF 30 will respond by sending a 200 OK message via the I/S-CSCF 28 to the MS client 20 of the user element 16 (steps 406 and 408). The CCF 30 will then negotiate with the MRF 38 to request an announcement port for a select announcement to be provided to the remote user of the remote endpoint 36 (step 410). The CCF 30 will provide the requisite communication information for the MRF 38 to the remote endpoint 36 in the SDP information of an Update message, which is forwarded toward the remote endpoint 36 via the I/S-CSCF 28 (steps 412 and 414). The CCF 30 will receive a 200 OK message from the remote endpoint 36 via the I/S-CSCF 28 (steps 416 and 418).

At this point, a bearer path for the announcement is established between the MRF 38 and the remote endpoint 36 (step 420), and the MRF 38 will provide the select announcement to the remote user of the remote endpoint 36 (step 422). Again, the call from the perspective of the remote endpoint 36 is maintained while the connection is moved from the MS client 20 of the user element 16 to the MRF 38. As described below, the connection for the call is further transferred to the CS client 18 of the user element 16 to complete the transfer from the MS 12 to the CS 14.

When the CCF 30 realizes that the announcement is or will be provided to the remote user of the remote endpoint 36, a Notify message is sent to the MS client 20 via the I/S-CSCF 28 to alert the user element 16 that preparation for the transition is complete (steps 424 and 426). In response, the user element 16 will release MS access (step 428), acquire CS access (step 430), and register with the CS (step 432). In traditional SIP fashion, the CCF 30 will send a Bye message via the I/S-CSCF 28 toward the remote endpoint 36 (steps 434 and 436). However, the Bye message will be dropped, because access to the MS 12 is no longer available.

Once the CS client 18 of the user element 16 is registered with the CS 14, the CS client 18 will send a Setup message to initiate a call to the CCF 30 using the CCF PSI. The Setup message is received by the serving VMSC 22 (step 438), which will respond by sending an Initial Address Message (IAM) to the appropriate media gateway controller 24 (step 440), as well as sending a Call Proceeding message back to the CS client 18 of the user element 16 (step 442). The media gateway controller 24 will then send an Invite message to the CCF 30 via the I/S-CSCF 28 using the CCF PSI URL (steps 444 and 446). The Invite will offer the media gateway controller 24, and indirectly the media gateway 26, as an MS endpoint for the call. In response, the CCF 30 will send an Update message offering the media gateway controller 24 as the endpoint for the call toward the remote endpoint 36 via the I/S-CSCF 28 (steps 448 and 450). Next, the intermediate SIP message exchange and resource reservation handshaking may take place between the CCF 30 and the media gateway controller 24, as well as with the remote endpoint 36 (step 452). The CCF 30 will ultimately receive a 200 OK message from the remote endpoint 36 via the I/S-CSCF 28 (steps 454 and 456), and forward the 200 OK message to the media gateway controller 24 (steps 458 and 460). The media gateway controller 24 will respond to the 200 OK message by sending an Address Complete Message (ACM) to the VMSC 22 (step 462), which will send an Alerting message to the CS client 18 of the user element 16 (step 464).

To emulate answering the call initiated from the CS client 18 of the user element 16, the CCF 30 will send an Acknowledgement message to the media gateway controller 24 via the I/S-CSCF 28 (steps 466 and 468). The media gateway controller 24 will send an Answer Message (ANM) to the VMSC 22 (step 470), which will send a Connect message to the CS client 18 (step 472), wherein a circuit-switched connection is established between the CS client 18 of the user element 16 and the media gateway 26, and a packet session is established from the media gateway 26 toward the remote endpoint 36. The media gateway 26 will effectively connect the circuit-switched connection and the packet session to form the CS/MS bearer path between the CS client 18 of the user element 16 and the remote endpoint 36, or an appropriate gateway element (step 474).

Figure 7:
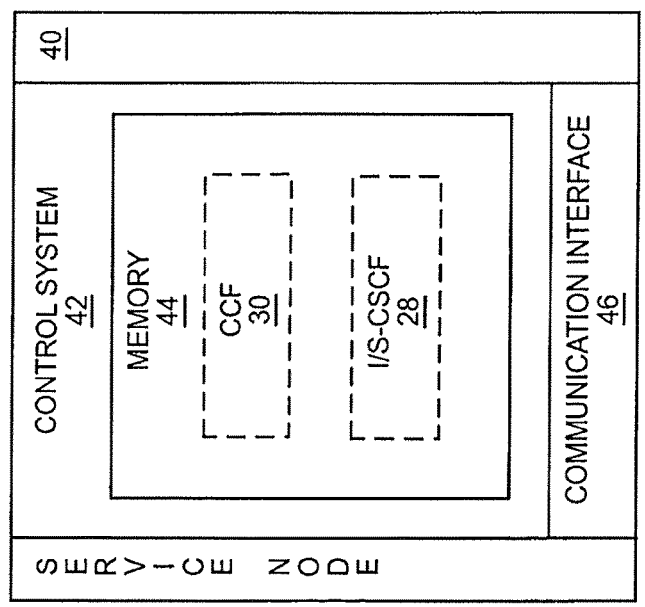
FIG. 7 is a block representation of a service node according to one embodiment of the present invention.

With reference to FIG. 7, a service node 40 is provided according to one embodiment of the present invention. The service node 44 may reside in the MS 12 and include a control system 42 and associated memory 44 to provide the functionality for any one or a combination of the CCF 30 and the I/S-CSCF 28 (S-CSCF and/or I-CSCF). The control system 42 will also be associated with a communication interface 46 to facilitate communications with any entity affiliated with the MS 12 or appropriately associated networks.

Figure 8:
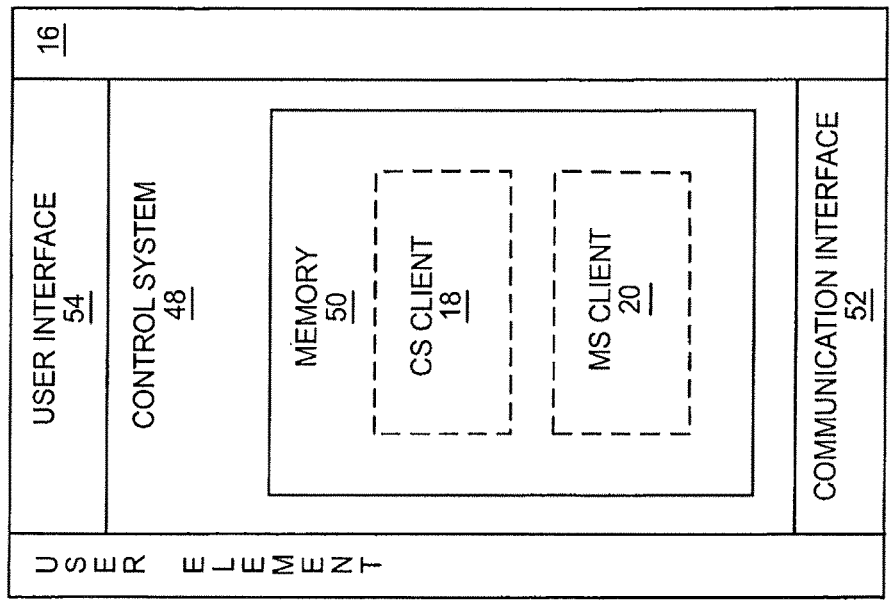
FIG. 8 is a block representation of a user element according to one embodiment of the present invention.

With reference to FIG. 8, a block representation of a user element 16 is provided. The user element 16 may include a control system 48 having sufficient memory 50 to support operation of the CS client 18 and the MS client 20. The control system 48 will cooperate closely with a communication interface 52 to allow the CS client 18 and the MS client 20 to facilitate communications over the CS 14 or the MS 12 as described above. The control system 48 may also be associated with a user interface 54, which will facilitate interaction with the user. The user interface 54 may include a microphone and speaker to facilitate voice communications with the user, as well as a keypad and display to allow the user to input and view information.

Those skilled in the art will recognize improvements and modifications to the preferred embodiments of the present invention. All such improvements and modifications are considered within the scope of the concepts disclosed herein and the claims that follow.

What is claimed is:

1. A method of performing voice continuity in a network node, the method comprising:
   receiving, via a call session control function (CSCF) at a continuity control function (CCF) of the network node, a first message from a client of a first subsystem, the first message including at least one transition indication indicating transition of an ongoing session from the first subsystem to a second subsystem, wherein the CCF anchors active circuit-switched subsystem (CS) calls and home multimedia subsystem (MS) sessions;
   in response to receiving the first message, sending a first response from the CCF via a communication interface on the network node;
   receiving, from a client of the second subsystem at the CCF, a second message via a target access leg, the second message comprising a CCF public service identities (PSI); and
   sending, from the CCF via the communication interface, a session initiation protocol (SIP) 200 OK message to indicate voice continuity of the ongoing session has been successful,
   wherein the ongoing session is anchored at the CCF in an MS, and wherein the network node is configured to invoke the CCF when a bearer path interruption occurs while transferring the ongoing session between a CS and the MS to maintain the ongoing session during the transfer.

2. The method as set forth in claim 1, wherein at least one of receiving the first message or sending the SIP 200 OK is on the target access leg.

3. The method of claim 1, wherein the ongoing session is established over an initial bearer path between a remote endpoint and a user equipment through a media gateway.

4. The method of claim 1, wherein the CCF employs a back to back user agent function (B2BUA).

5. The method of claim 1, wherein the SIP 200 OK message is sent to one of at least a media gateway controller (MGC) or a mobile switching center (MSC).

6. A network node for performing voice continuity, wherein the network node comprises:
   a communication interface; and
   a control system to facilitate communications via the communication interface, wherein the control system is configured to:
   receive, via a call session control function (CSCF) at a continuity control function (CCF) of the network node, a first message from a client of a first subsystem, the first message including at least one transition indication indicating transition of an ongoing session from the first subsystem to a second subsystem, wherein the CCF anchors active circuit-switched subsystem (CS) calls and home multimedia subsystem (MS) sessions;
   in response to receiving the first message, send a first response from the CCF;
   receive, from a client of the second subsystem at the CCF, a second message via a target access leg, the second message comprising a CCF public service identities (PSI); and
   send, from the CCF, a session initiation protocol (SIP) 200 OK message to perform voice continuity such that the ongoing session is maintained while transferring the ongoing session from the first subsystem to the second subsystem, wherein the ongoing session is anchored at the CCF in an MS, and wherein the network node is configured to invoke the CCF when a bearer path interruption occurs while transferring the ongoing session between a CS and the MS to maintain the ongoing session during the transfer.

7. The network node as set forth in claim 6, wherein at least one of receiving the first message or sending the SIP 200 OK message is on the target access leg, wherein the CSCF comprises a serving CSCF (S-CSCF), and wherein the target access leg is anchored at the CCF and extends through the S-CSCF.

8. The network node as set forth in claim 6, wherein the ongoing session is established over an initial bearer path between a remote endpoint and a user equipment through a media gateway.

9. A method of performing voice continuity in a user equipment, the method comprising:
   sending, to a continuity control function (CCF) and via an interface on the user equipment, a first message including at least one transition indication corresponding to an ongoing session with the user equipment, wherein the CCF anchors active circuit-switched subsystem (CS) calls and home multimedia subsystem (MS) sessions;
   receiving, via the interface, a first response acknowledging receipt of the first message; and
   sending, via the interface, a second message in response to receipt of said first response to perform voice continuity such that the ongoing session is maintained while the user equipment transitions from a first subsystem to a second subsystem,
   wherein the first message is sent from an MS client on the user equipment in response to the user equipment detecting a need to transition from the first subsystem to the second subsystem,
   wherein the second message contains a CCF public service identities (PSI), wherein the CCF PSI enables initiating session transfers between the first and second subsystems, and
   wherein the SETUP message is sent from a CS client on the user equipment to transfer the ongoing session from a multimedia subsystem to a CS subsystem, and wherein the CCF is invoked to maintain the ongoing session when a bearer path interruption occurs during the transfer.

10. The method as set forth in claim 9, wherein the second message is a SETUP message sent to the CCF via a call session control function (CSCF) configured to act as a proxy for the user equipment, and wherein the CSCF comprises at least one of a serving CSCF (S-CSCF) or an interrogating CSCF (I-CSCF).

11. The method as set forth in claim 9, wherein the ongoing session is initially established from the MS client on the user equipment toward a remote endpoint via an MS.

12. A user equipment for performing voice continuity, the user equipment configured to:
   send, to a continuity control function (CCF), a first message including at least one transition indication corresponding to an ongoing session with the user equipment, wherein the CCF anchors active circuit-switched subsystem (CS) calls and home multimedia subsystem (MS) sessions;
   receive a first response acknowledging receipt of said first message; and
   send a second message in response to receipt of said first response to perform voice continuity such that the ongoing session is maintained while the user equipment transitions from a first subsystem to a second subsystem,
   wherein the first message is sent from an MS client on the user equipment in response to the user equipment detecting a need to transition from the first subsystem to the second subsystem,
   wherein the second message contains a CCF public service identities (PSI), wherein the CCF PSI enables initiating session transfers between the first and second subsystems, and
   wherein the CCF is invoked to maintain the ongoing session when a bearer path interruption occurs during the transfer.

13. The user equipment as set forth in claim 12, wherein the second message is a SETUP message sent to the CCF via a call session control function (CSCF) configured to act as a proxy for the user equipment, wherein the CSCF comprises at least one of a serving CSCF (S-CSCF) or an interrogating CSCF (I-CSCF).

14. The user equipment as set forth in claim 13, wherein the SETUP message is sent to the CCF from a CS client on the user equipment, and wherein the CCF is configured to perform voice continuity to transfer the ongoing session from a multimedia subsystem to a CS subsystem in response to receiving the SETUP message.

15. The user equipment as set forth in claim 14, wherein the ongoing session is initially established from the MS client on the user equipment toward a remote endpoint via the multimedia subsystem.

* * * * *